(12) United States Patent
Brown et al.

(10) Patent No.: US 7,549,348 B2
(45) Date of Patent: Jun. 23, 2009

(54) FLOW CHARACTERISTIC INDICATING FLOW METER

(75) Inventors: Mark A. Brown, Oak Grove, MO (US); Philip M. Burger, Olathe, KS (US)

(73) Assignee: Burger & Brown Engineering, Inc., Grandview, MO (US)

( * ) Notice: Subject to any disclaimer, the term of this patent is extended or adjusted under 35 U.S.C. 154(b) by 0 days.

(21) Appl. No.: 11/769,345

(22) Filed: Jun. 27, 2007

(65) Prior Publication Data
US 2009/0000395 A1 Jan. 1, 2009

(51) Int. Cl.
*G01F 1/24* (2006.01)
(52) U.S. Cl. .................... 73/861.56; 73/861.58
(58) Field of Classification Search .. 73/861.53–861.58
See application file for complete search history.

(56) References Cited

U.S. PATENT DOCUMENTS

| | | | |
|---|---|---|---|
| 1,980,761 A | 11/1934 | Mock et al. | |
| 2,321,041 A | 6/1943 | Porter | |
| 3,408,865 A | 11/1968 | Chenault | |
| 3,675,481 A * | 7/1972 | Phillips | 73/861.55 |
| 3,744,313 A * | 7/1973 | Thompson | 73/861.54 |
| 3,842,671 A * | 10/1974 | Frizelle | 73/861.57 |
| 3,910,112 A | 10/1975 | Gerlach | |
| 4,424,716 A * | 1/1984 | Boehringer et al. | 73/861.56 |
| 4,559,834 A * | 12/1985 | Phillips et al. | 73/861.55 |
| 4,619,139 A | 10/1986 | Rosaen | |
| 4,656,874 A | 4/1987 | Kulig | |
| 4,787,253 A * | 11/1988 | deFasselle et al. | 73/861.54 |
| 4,899,582 A | 2/1990 | O'Dougherty | |
| 4,945,771 A * | 8/1990 | Ogden | 73/861.58 |
| 5,024,105 A * | 6/1991 | Tentler et al. | 73/861.58 |
| 5,086,654 A * | 2/1992 | Malminen | 73/861.58 |
| 5,190,075 A * | 3/1993 | Tentler et al. | 137/501 |
| 5,549,277 A | 8/1996 | Franz | |
| 5,655,568 A | 8/1997 | Bhargava et al. | |
| 6,212,957 B1 | 4/2001 | McCombs et al. | |
| 6,758,104 B2 | 7/2004 | Leys et al. | |
| 7,140,262 B1 * | 11/2006 | Vaughn et al. | 73/861.57 |

* cited by examiner

*Primary Examiner*—Harshad Patel
(74) *Attorney, Agent, or Firm*—Erickson, Kernell, Derusseau & Kleypas, LLC

(57) ABSTRACT

A flow meter having a scale with temperature set points corresponding to a flow rate that a known fluid flowing therethrough at the set point temperature must reach to ensure turbulent flow of the fluid through a cooling system of a specified diameter. The flow meter preferably includes a plurality of scales, each having temperature set points corresponding to a different sized passageway in the mold cooling system. The scales are printed on a sleeve, rotatably mounted on a cylindrical body of the flow meter. The scales are selectively rotated into view by an operator to permit the operator to use the appropriate scale corresponding to the diameter of the passageways of the cooling system with which the flow meter is to be used.

20 Claims, 4 Drawing Sheets

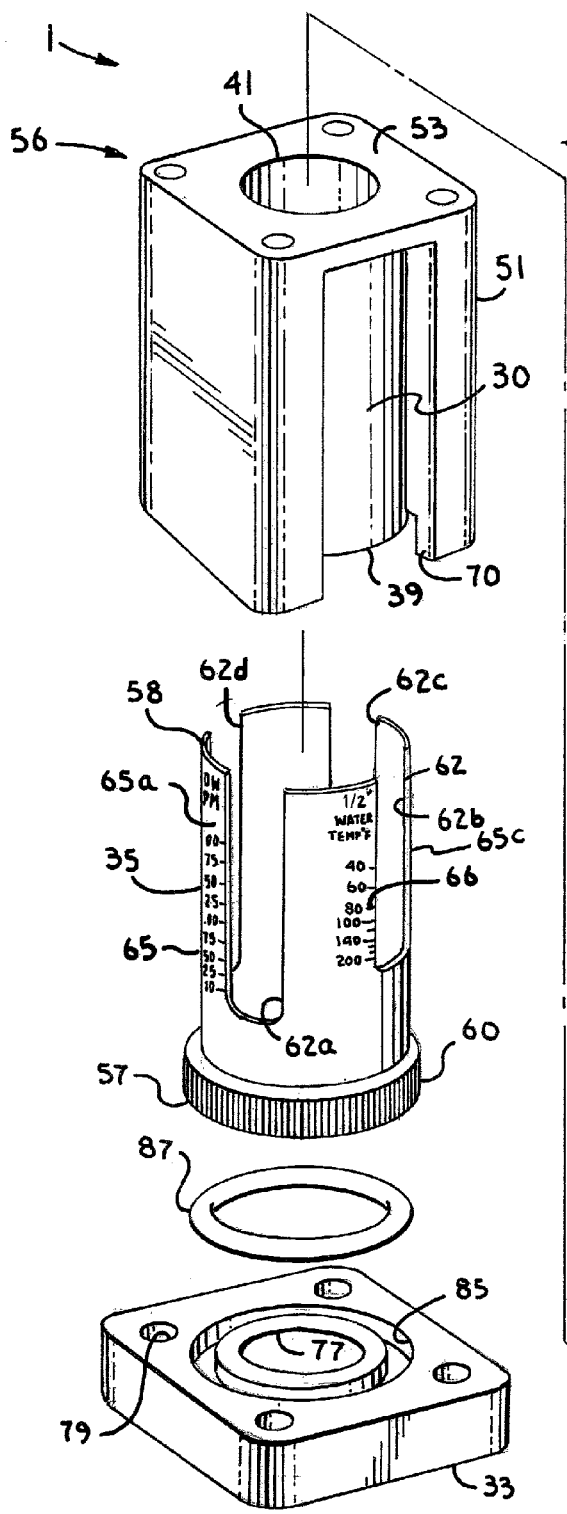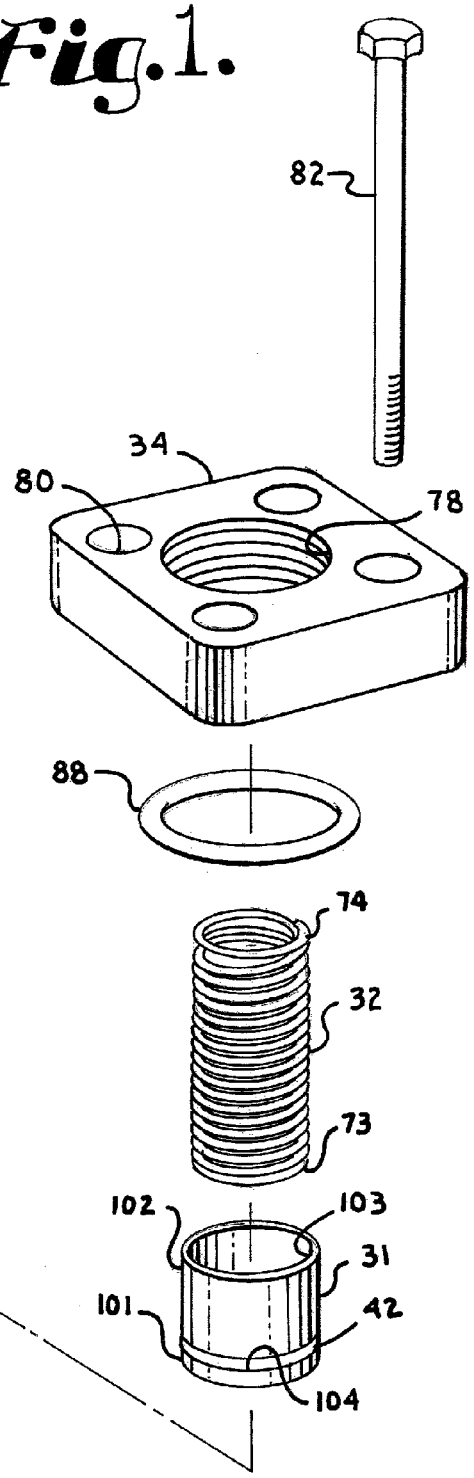
Fig.1.

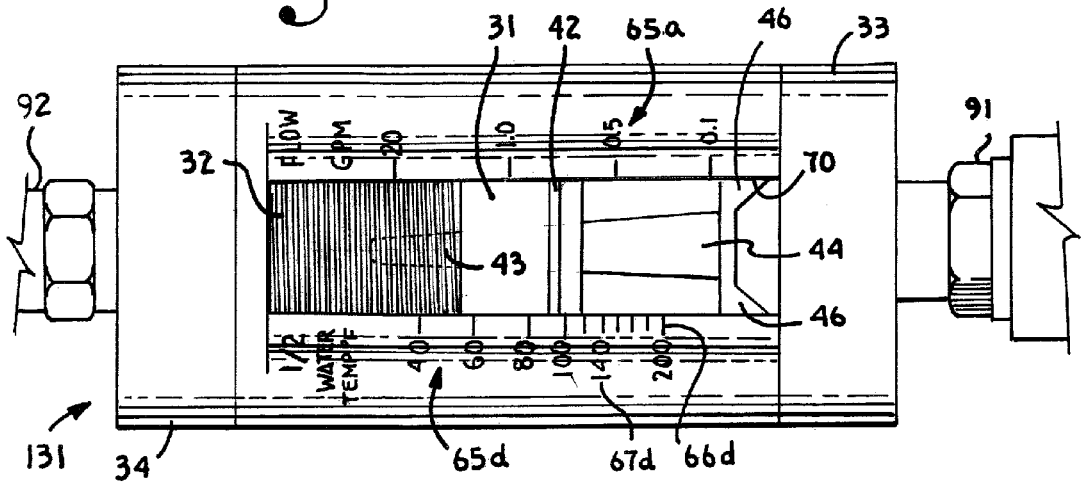

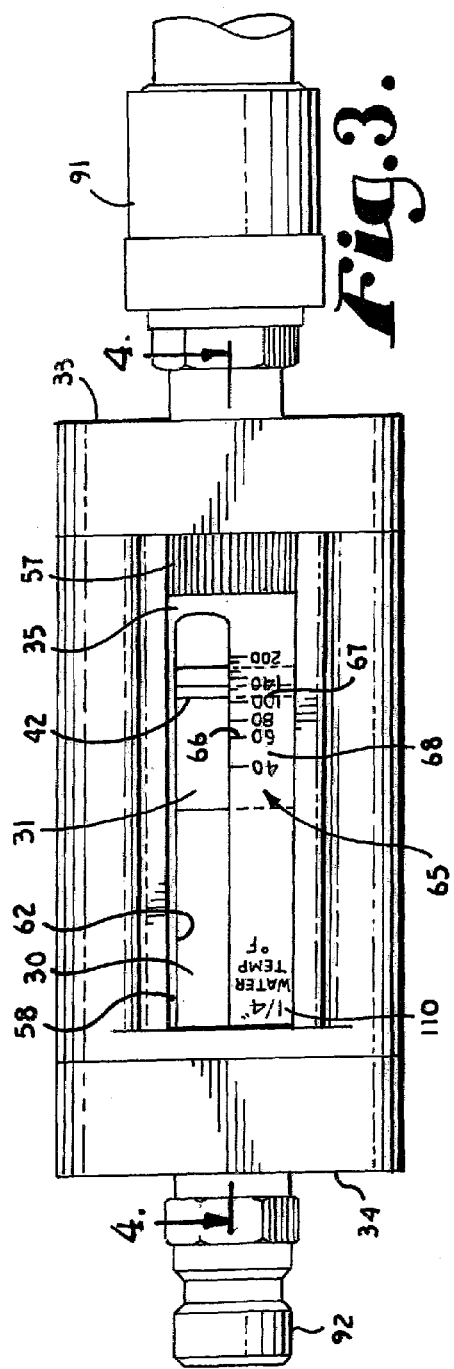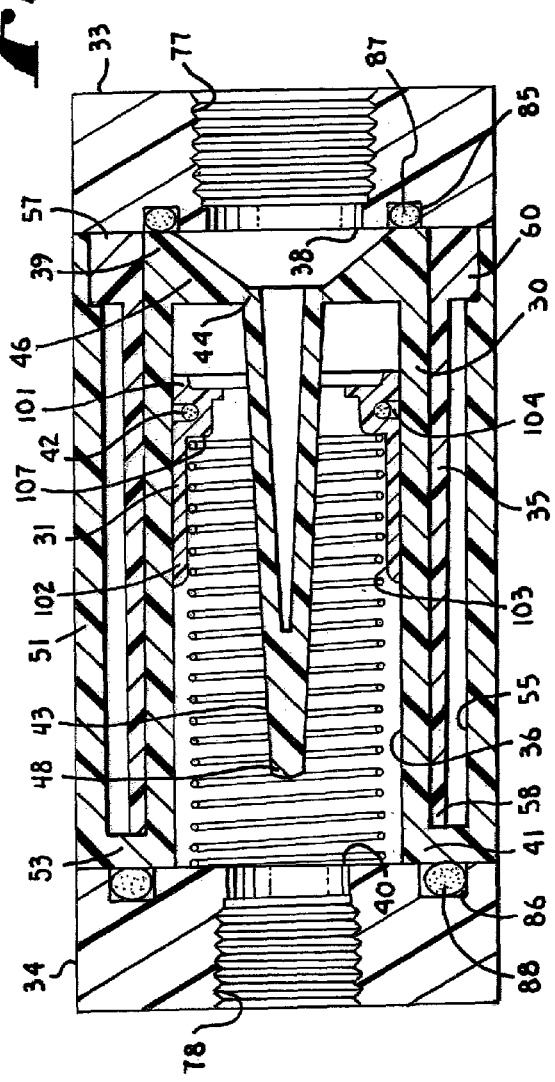

FLOW CHARACTERISTIC INDICATING FLOW METER

BACKGROUND OF THE INVENTION

The present invention relates to flow meters and in particular flow meters which can be utilized to determine if the liquid flowing through a piping system associated therewith is flowing under turbulent or laminar flow conditions.

Water flowing turbulently is much more efficient at removing heat in a cooling system than water flowing under laminar flow conditions. However, once turbulent flow is obtained increasing the flow rate further does not appreciably improve the cooling rate of the system. In molding applications, many mold operators unnecessarily try to maximize the flow of water through their cooling systems to ensure turbulent flow. Doing so simply increases the energy costs for pumping more water than necessary through the system and possibly limiting the amount of cooling water available for cooling additional molds on the same cooling system circuit.

Whether the flow of water through a pipe or channel is turbulent depends on the diameter of the pipe, the flow rate of the water through the pipe and the temperature of the water. For a pipe or cooling channel of known diameter, if the temperature of the water is known, one can determine what flow rate would be required to obtain turbulent flow. More specifically, the volumetric flow rate times the pipe diameter divided by the kinematic viscosity (which is temperature dependent) produces what is referred to as the Reynolds number. A Reynolds number of approximately 3500 or more is understood to be indicative of turbulent flow.

Injection molds generally have cooling water channels of a fixed diameter. The diameters for different molds vary but standard diameters are ¼, ⅜ or ½ inch. A preferred type of flow meter currently in use is a variable area flow meter having a float, piston or other movable flow indicator, slidably mounted on a conical post within a clear cylindrical tube. The piston is restrained from flowing out the distal end of the cylindrical tube by a spring. Water flowing through the chamber pushes the piston toward the distal end of the chamber against the force of the spring. The greater the flow rate, the more the piston compresses the spring and moves toward the distal end. A brightly colored band or indicator band extending around the piston is visible through the clear cylindrical tube and through a window or sight formed in the flow meter body. A scale printed along the side of the sight, indicates the flow rate therethrough such as in gallons per minute. See generally U.S. Pat. No. 4,619,139.

Utilizing existing flow meters, the current practice for determining whether the flow through the associated piping system is turbulent involves first determining the flow rate of the fluid therethrough using the flow meter. The flow rate measurement is used with the temperature of the fluid flowing therethrough and the size of the conduit to determine a Reynolds number for the fluid flowing therethrough. The Reynolds number is typically obtained from a standard chart or the like. However, such a system is somewhat time consuming and is not conducive to allowing a quick determination of whether the flow rate selected will result in turbulent flow through the system. There remains a need for a flow meter which can be used by a user to more readily determine whether the fluid flowing through a piping system associated therewith is flowing under turbulent flow conditions and to set the flow rate accordingly. It is also foreseen that there are likely to be applications for such a device which can be used by a user to determine whether the fluid flowing through a piping system is flowing under laminar flow conditions.

SUMMARY OF THE INVENTION

The present invention comprises a flow meter having a scale with temperature set points corresponding to a flow rate that a known fluid flowing therethrough at the set point temperature must reach to ensure turbulent flow of the fluid through a cooling system of a specified diameter. In a preferred embodiment, the flow meter includes a plurality of scales, each having temperature set points corresponding to a different sized passageway in the mold cooling system. The scales are printed on a sleeve, rotatably mounted on a cylindrical body of the flow meter. The scales may be selectively rotated into view by an operator to permit the operator to use the appropriate scale corresponding to the diameter of the passageways of the cooling system with which the flow meter is to be used.

BRIEF DESCRIPTION OF THE DRAWINGS

FIG. 1 is an exploded, perspective view of a flow meter of the present invention.

FIG. 2 is a schematic diagram of a mold cooling system utilizing flow meters of the present invention.

FIG. 3 is a fragmentary side elevational view of the flow meter as shown in FIG. 1 connected to piping for a mold cooling system.

FIG. 4 is an enlarged cross sectional view of the flow meter taken generally along lines 4-4 of FIG. 3.

FIG. 6 is a fragmentary side elevational view similar to FIG. 3 showing an alternative embodiment of the flow meter.

DETAILED DESCRIPTION OF THE PREFERRED EMBODIMENT

Figure 5:
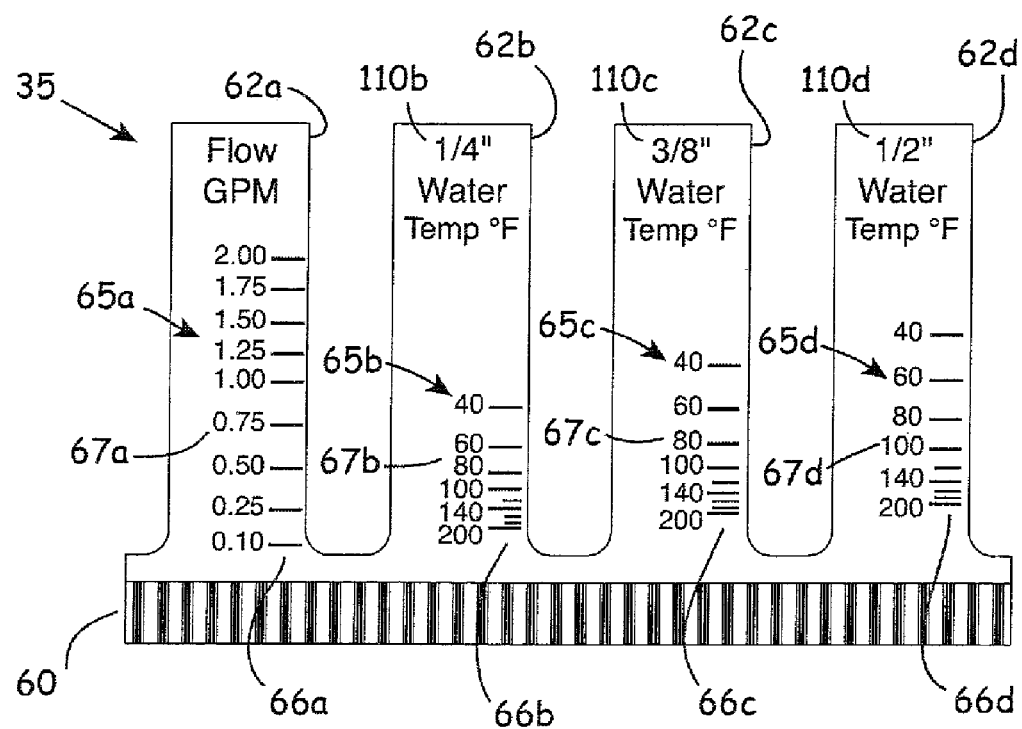
FIG. 5 is a flat projections of an alternative embodiment of the slotted, scale bearing sleeve of FIG. 1.

As required, detailed embodiments of the present invention are disclosed herein; however, it is to be understood that the disclosed embodiments are merely exemplary of the invention, which may be embodied in various forms. Therefore specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a flow meter comprising one embodiment of the present invention. The flow meter 1 is particularly well adapted for use in monitoring the flow of water through a cooling water circulation system 3 for an injection molding facility as shown schematically in FIG. 2.

FIG. 2 comprises a process flow diagram of a representative cooling water circulation system 3 for supplying cooling water to a plurality of injection molds 5 utilizing flow meters 1 as described herein. Each mold 5 has an internal or mold cooling water circuit or piping system 6 formed therein for directing cooling water around one or more mold cavities (not shown) formed in the mold 5. Each mold 5 may include multiple mold cooling water circuits 6 associated with different mold cavities. In the flow diagram of FIG. 2, each mold 5 is shown as having two mold cooling water circuits 6. The mold cooling water circuits 6 are formed from channels or bores formed in the mold of generally uniform internal diameter. Standard dimensions for such channels for molds 5 made and used in the United States are ¼, ⅜ or ½ inch.

Cooling water is circulated through the cooling water circulation system 3 by a pump 10. Pump 10 pumps cooling water from a cooling tower 11 through a supply line 12, and manifold supply branches 13a, 13b and 13c to a plurality of cooling water supply manifolds 15, each one flow connected to one of the molds 5. Each manifold 15 splits the flow of cooling water into a plurality of mold supply lines 17. Two mold supply lines 17 are shown flow connecting each manifold 15 to the two mold cooling water circuits 6 of each mold 5. However, it is to be understood that the number of cooling water circuits 6 per mold 5 and the number of mold cavities associated with each cooling water circuit 6 can vary.

A cooling water return line 19 connects each cooling water circuit 6 to a return manifold 21. In the embodiment shown in FIG. 2, two return lines 19 are shown, one associated with each cooling water circuit 6. A cooling water return branch 23 connects each return manifold 21 to a main return line 25 which returns the cooling water pumped therethrough back to the cooling tower 11.

A flow meter 1 is shown flow connected to each mold supply line 17 in FIG. 2 and a flow control valve 27 is positioned on each mold supply line 17 upstream of the associated flow meter 1. The control valves 27 control the flow rate of cooling water through each mold cooling water circuit 6. It is to be understood that the flow meters 1 generally only have to be positioned in-line with the cooling water circuit 6 and therefore, the flow meters 1 and flow control valves 27 can also be positioned downstream of the mold 5 on the cooling water return line 19 of the mold for controlling the flow of cooling water through the associated mold cooling water circuit 6. It is to be understood that the cooling system 3 shown in FIG. 2 is simply representative of one application of the flow meter 1 of the present invention.

Returning to FIG. 1, the flow meter 1 comprises a flow tube 30, a flow rate indicating piston or float 31, a compression spring 32, first and second end caps 33 and 34 and a scale bearing sleeve 35 rotatably mounted on the flow tube 30. The flow meter 1 is shown assembled in FIG. 3 and a cross-sectional view thereof is shown in FIG. 4. Referring to FIGS. 1, 3 and 4 the flow tube 30 of the preferred embodiment comprises a cylindrical or peripheral wall defining a hollow flow chamber 36 extending therethrough and having a fluid inlet 38 at a first end 39 and a fluid outlet 40 at a second end 41. The piston 31 is tubular and has an indicator band 42 extending around an outer periphery thereof. The piston 31 is slidably mounted within the flow chamber 36 about a conical post 43. A base 44 of the conical post 43 is connected to the peripheral wall of the flow tube 30 proximate the first end 39 or fluid inlet 38 by fins or ribs 46 projecting radially outward from the post 43 to the flow tube 30. Spaces or openings extend between each fin 46 to permit fluid to flow therebetween and around the post 43. A tip 48 of the conical post 43 extends near the second end 41 of the flow tube 30. The flow tube 30 is formed from transparent material to permit viewing of the axial position of the indicator band 42 within the flow tube 30. As used herein, the word transparent is not intended to require complete transparency, rather transparent material is intended to cover materials which are sufficiently transparent to permit viewing of the indicator band 42 through the flow tube 30.

A shroud or curtain wall 51 is formed around the flow tube 30 and connected thereto by an end wall or flange 53. The end wall 53 is integrally formed with and projects between the flow tube 30 and the shroud 51 at the second end 41 of the flow tube 30. The end wall 53 and shroud 51 shown are square in cross-section. A gap 55 is formed between the flow tube 30 and the shroud 51 running from the first end 39 of the flow tube 30 to an inner surface of the end wall 53. The gap 55 is sized to be wide enough to receive the scale bearing sleeve 35 and to allow it to freely rotate about the flow tube 30. The flow tube 30, conical post 43, fins 46, shroud 51 and end wall 53 are preferably molded as a single piece which may generally be described as the body of the flow meter or the flow meter body 56.

As best seen in FIG. 1, the scale bearing sleeve 35, having a first end 57 and a second end 58, is approximately the same length as or slightly shorter than the length of the flow tube 30 from the first end 39 of flow tube 30 to the inner surface of the end wall 53. A knurled peripheral flange 60 is formed on and extends around the sleeve 35 at its first end 57 to facilitate manual rotation of the sleeve 35 about the flow tube 30. A plurality of slots 62 are formed in the sleeve 35 around the periphery thereof, with four slots, 62a-d, formed in the embodiment shown in FIGS. 1, 3 and 4. Each slot 62 extends from a second end 58 of the sleeve 35 toward the first end 57 thereof and permits viewing of the flow tube 30 therebehind and the indicating band 42 on the piston 31 within the flow tube 30.

A scale 65 is printed on, applied to, formed on or otherwise associated with the outer surface of the sleeve 35 along an edge of each slot 62 such that there are four scales 65a-d associated with slots 62a-d respectively. Each scale 65 comprises scale markings 66 and scale indicia 67. The scale markings 66 and scale indicia 67 correspond to or are associated with the flow rate of a fluid flowing through the flow meter 1 as discussed in more detail hereafter. Each scale 65 may be printed on a label 68 such that is then applied to the sleeve 35 or it may be printed directly on the sleeve 35. It is foreseen that the scale 65 could also be printed on, applied to, formed on or otherwise associated with the inner surface of the sleeve 35 and viewable through the material forming the sleeve.

Referring to FIGS. 1 and 3, the shroud 51 is discontinuous about a portion of its periphery forming an opening or window 70 therein. The window 70 permits viewing of the indicator band 42 of the piston 31 through a selected slot 62 in sleeve 35 and through the flow tube 30 when the selected slot 62 in sleeve 35 is aligned with the window 70. The window 70 is preferably wider than the slots 62 to permit simultaneous viewing of both a selected slot 62 and the scale 65 associated with the selected slot 62, such that the point at which the indicator band 42 intersects the scale 65 of the selected slot 62 is viewable through the window 70.

As best seen in FIGS. 1 and 4, sliding movement of the piston 31, on which the indicator band 42 is mounted, within the flow chamber 36, is controlled by the compression spring 32. A first end 73 of the spring 32 engages or abuts against the piston 31 and a second end 74 of the spring engages or abuts against and inner surface of the second end cap 34 which functions as an outlet stop for the spring 32, preventing the spring 32 from extending out of the outlet 40 to the flow tube flow chamber 36. The spring 32 normally urges the piston 31 toward the inlet 38 of the flow chamber 36. The fins 46, connecting the conical post 43 to the flow tube 30, function as an inlet stop, prevent the piston 31 from being advanced out of the inlet 38 to the flow chamber 36.

The first and second end caps 33 and 34 are shaped to match the general shape of the flow meter body 56, which in the preferred embodiment is generally square in cross-section. Each end cap 33 and 34 includes a central threaded bore 77 and 78 respectively. Four bolt receiving bores 79 and 80 extend through the end caps 33 and 34 respectively near the corners thereof. Each pair of aligned bores 79 and 80 are adapted to receive a bolt 82 (one shown in FIG. 1) for securing the end caps 33 and 34 to the flow meter body 56. One set of the bores 79 or 80 is threaded to receive a threaded end of the associated bolts 82. The other set of bores 79 or 80 preferably includes a countersink so that the head of the bolts 82 do not extend past the outer surface of the associated end cap 33 or 34.

The central threaded bores 77 and 78 of the end caps 33 and 34 are axially aligned with the flow chamber 36 of the flow tube 30 when the end caps are secured against the flow meter body 56. The diameter of the central threaded bore 78 of end cap 34 is smaller than the inner diameter of the flow tube 30 such that a portion of the inner surface of end cap 34 extends across the outer portion of the flow tube flow chamber 36 to form the outlet stop for the spring 32 as discussed previously. The diameter of the central threaded bore 77 of end cap 33 is also smaller than the inner diameter of the flow tube 30.

Circular O-ring receiving grooves 85 and 86 are formed in the inner surface of the end caps 33 and 34 respectively, concentric with and in outwardly spaced relation to the central threaded bores 77 and 78 respectively. O-rings seals 87 and 88 are positioned in the grooves 85 and 86 respectively. The O-rings 87 and 88 are compressed between the end caps 33 and 34 and the flow meter body 56 when the end caps 33 and 34 are bolted to the flow meter body 56 to form a water tight seal between the flow chamber 36 of the tube 30 and the central bores 77 and 78 in the end caps 33 and 34 respectively.

Referring to FIG. 3, the central threaded bores 77 and 78 of the end caps 33 and 34 are each adapted to receive an end of a pipe or tube which may include the threaded ends of fittings 91 and 92 such as quick connect couplers, threaded into the threaded bores 77 and 78 respectively to facilitate connection of the end of a length of flexible tubing thereto. The tubing may be connected at an opposite end to a mold circuit 6 and or a manifold 15 or 21 as discussed previously.

Referring again to FIGS. 1 and 4, the piston 31 is tubular and includes a head 101 and a tail 102 and an axial bore or hole 103 extending therethrough. A peripheral groove 104 is formed around the outer periphery of the piston head 101 and the indicator band 42 is secured, positioned or formed therein. In the embodiment shown, the indicator band 42 is a contrastingly colored elastic band or O-ring secured in the groove 104. It is foreseen that the indicator band 42 could be painted or printed on the piston head 101 in the groove 104 or simply on the outer surface of the piston 31. It is also foreseen that the indicator band 42 could comprise some form of marking or indicator other than a continuous band, including a line segment, arrow or dot formed on or connected to the outer surface of the piston 31.

A spring bearing shoulder or annular seat 107 against which the first end 73 of spring 32 abuts is formed on the piston 31 generally at the junction between the head 101 and the tail 102. In the embodiment shown, the spring bearing shoulder 107 is formed on the inner surface of the tubular piston 31. The first end 73 of the spring 32 extends into the tail 102 of the piston 31 and abuts against the spring bearing shoulder 107. It is to be understood that the spring bearing shoulder 107 could be formed around the outer periphery of the piston 31 with the tail 102 of the piston 31 extending into the first end 73 of the spring 32. However, positioning the first end 73 of spring 32 inside of the tail 102 provides a clearer view of the indicator band 42 which is less likely to be confused for one of the coils of the spring 32.

The relative dimensions of the piston bore 103 and the dimensions of the conical post 43 and the flow chamber 36 of flow tube 30 are selected in accordance with parameters and specifications known to those skilled in the art of flow meter design for providing a generally linear scale reading of flow rates though the flow meter. This type of flow meter is often referred to as a variable area flow meter. As the flow rate of a fluid flowing through the flow meter 1 increases, the piston 31 is pushed further toward the second end 41 of the flow tube 30 against the biasing force of the spring 32.

FIG. 5 is a flat or planar projection of the sleeve 35 showing each of the slots 62 a-d and associated scales 65a-d printed thereon. In the embodiment shown in FIG. 5 the scales 65a-d are generally shown printed directly on the sleeve 35 without a label. A first of the scales 65, which may be referred to as a standard scale or a flow rate indicating scale 65a, includes scale indicia 67a which provides a direct visual indication of the flow rate through the flow meter in unit volume per unit time, such as gallons per minute wherein the indicia 67a comprise the numerical value of the flow rate. The scale markings 66a and scale indicia 67a are calibrated for the flow meter.

The remaining scales 65b, 65c and 65d provide a visual indication of the flow rate which will result in turbulent flow through a pipe or opening of a specific diameter for a specific liquid at a specific temperature represented by the individual scale markings 66b-d and associated scale indicia 67b-d. Each scale 65b-d corresponds to a pipe or opening of a different diameter connected to the flow meter 1, such as ¼ inch, ⅜ inch or ½ inch respectively. Pipe size selection markings 110, namely, markings 110b-d are printed or formed on the sleeve 35 adjacent each scale 65b-d respectively to identify the pipe size for which the scale 65b-d is calibrated. The scale indicia 67b-d and the corresponding scale markings 66b-d on the scales 65b-d respectively, correspond to the numerical value of the temperature of the liquid flowing through the flow meter 1 and may be referred to as temperature set points.

To use the flow meter 1 to ensure turbulent flow through a pipe, conduit or channel, such as a mold cooling circuit 6, of a known diameter, first the scale bearing sleeve 35 is rotated to rotate into alignment with the shroud window 70 the scale 65 calibrated for a pipe diameter corresponding to the diameter of the mold cooling circuit 6. The temperature of the liquid flowing through the cooling circuit, which in this case is water, is measured and noted. As discussed below, the temperature of the liquid is preferably taken or measured upstream of or before entering the cooling circuit. The flow rate through the flow meter 1 is then adjusted, by adjusting the associated flow control valve 27 in the example shown, until the indicator band 42 on the piston 31 aligns with or relative to the scale 65 at a point corresponding to the measured temperature of the liquid entering the cooling circuit 6 as indicated by the corresponding scale indicia 67 such as indicia 67b-d on scales 65b-d.

The scales 65b-d and the temperature set points 67b-d thereon are calibrated to correspond to a Reynolds number known to be indicative of turbulent flow. The Reynolds number (which is unitless) is the ratio of inertial forces to viscous forces in a fluid or liquid and can be used to identify different flow regimes, such as laminar or turbulent flow. Laminar flow occurs at low Reynolds numbers where viscous forces are dominant and is characterized by smooth, constant fluid motion. Turbulent flow occurs at high Reynolds numbers where inertial forces dominate, producing random eddies, vortices and other flow fluctuations. These flow fluctuations or mixing of the water increases the cooling affect of the cooling water.

The formula for determining the Reynolds number for a pipe of circular cross-section may be given as the fluid density times the mean fluid velocity times the diameter divided by the dynamic fluid viscosity. This formula may be simplified as the mean fluid velocity times the diameter divided by the kinematic fluid viscosity, where the kinematic fluid viscosity is the dynamic fluid viscosity divided by the fluid density.

Because the viscosity of a fluid is temperature dependent, the flow rate of a fluid flowing through a pipe of a specified diameter required to achieve turbulent flow will vary depending on the temperature of the fluid. The Reynolds number increases with increases in temperature. Therefore, the higher the temperature of the fluid flowing through a pipe, the lower the flow rate required to obtain turbulent flow.

The transition between laminar and turbulent flow is often indicated by a critical Reynolds number. For pipes of circular cross-section, the critical Reynolds number is generally accepted to be 2300. However, within a certain range around the critical Reynolds number, the flow is neither fully laminar nor fully turbulent. Therefore, to ensure turbulent flow, flow conditions, including flow rate, temperature and pipe diameter for a known fluid, are generally selected to result in a Reynolds number of at least 3000. To ensure laminar flow, flow conditions are generally selected to result in a Reynolds number of 2000 or less.

In calibrating the scales 65b-d of the application shown in FIG. 1 for a preferred embodiment, the temperature set points 67b-d and scale markings 66b-d are selected to correspond to a flow rate which for the selected temperature of fluid flowing through an associated pipe of a specified diameter will produce a Reynolds number which is high enough to ensure turbulent flow while maintaining a relatively low flow rate, such as a Reynolds number of 4000. By calibrating the scales 65b-d based upon a Reynolds number of 4000, relatively small changes in the temperature of the fluid, small variations in pipe diameter or other anomalies are not likely to result in unwanted laminar flow conditions through the pipe or cooling circuit 6. It is foreseen that the scales 65b-d may also be calibrated based upon other Reynolds numbers to ensure turbulent flow depending on the degree of certainty required that the flow is turbulent. For example the scales 65b-d may be calibrated based upon Reynolds numbers of 3000 or 3500 for many molding applications. In medical applications wherein a higher degree of certainty is required, the scales could be calibrated based upon a Reynolds number of 10,000. In most applications in which it is desirable to achieve turbulent flow while minimizing the flow rate therethrough, the scales 65b-d will be calibrated based upon a Reynolds number ranging from 3000 to 5000 or up to 11000 if intended for medical applications.

As mentioned previously, the temperature measurement for determining the temperature set point on scales 65b-d is taken upstream of and prior to entry of the cooling water into the cooling circuit 6. In cooling the mold, the temperature of the cooling water flowing through the cooling circuit 6 will increase. As noted previously, as the temperature of the water increases, so does the resulting Reynolds number, assuming all other variables remain constant. Because the Reynolds number increases with increasing temperature, the flow rate required to achieve turbulent flow for a pipe of known diameter decreases with increasing temperature of the fluid. Therefore, by selecting the temperature set point 67b-d to achieve turbulent flow based upon the measured temperature of the water entering the cooling circuit, the increase in temperature of the cooling water flowing through the cooling circuit 6 will not change the flow conditions of the water flowing therethrough from turbulent to laminar.

When designed for use in a cooling water application for molds such as shown diagrammatically in FIG. 2, a typical temperature set point scale such as scales 65b-d, will cover temperature set points for a range of water temperatures from at least approximately fifty (50) to sixty (60) degrees Fahrenheit. In the embodiment shown, the scale includes scale indicia from 40° to 200° F. The larger the diameter of the pipe or channel for a cooling circuit 6 or the like, the higher the flow rate will have to be to achieve turbulent flow. Therefore, for the embodiment of the flow meter 1 shown, the slots 62 and corresponding to larger diameter pipe start closer to the second end 58 of the sleeve 35 and closer to the second end 41 of the flow tube 30. However, it is foreseen that the slots 62 could be of equal length as shown in the embodiment depicted by the planar projection of the sleeve 35 shown in FIG. 5.

After using the appropriate flow meter scale 65b-d to adjust the flow rate through the flow meter 1 until the indicator band is aligned with the scale marking associated with the temperature of the fluid flowing therethrough, the sleeve can be rotated to align the associated slot 62 for the standard scale 65a with the window 70. The user can then determine a numerical value for the flow rate at the corresponding temperature set point by viewing the scale indicia 67a aligned with the plunger indicator band 42.

It is to be understood that while certain forms of the present invention have been illustrated and described herein, it is not to be limited to the specific forms or arrangement of parts described and shown. For example it is foreseen that the scale markings and scale indicia could be calibrated to provide temperature set points corresponding to a flow rate which will result in laminar flow of the known fluid flowing through the piping system of known diameter at the specified temperature. In such a system the scale 65 would be calibrated based upon a Reynolds number of approximately 2000 or less.

It is foreseen that one or more of the scales 65 could be printed or placed directly on the flow tube 30 or on the shroud 51 adjacent window 70 without use of a sleeve 35. In one such embodiment, the flow meter 1 likely would be installed with the scale 65b, 65c and 65d required for the specified pipe size positioned for ready viewing. Flow meter 131 as shown in FIG. 6 is representative of such an embodiment. In FIG. 6, corresponding parts are identified with numbers corresponding to the same parts of the embodiment shown in FIGS. 1, 3 and 4. It is foreseen that the scales 65b-d could be provided on labels along with instructions for a user to apply to the flow tube 30 the label for scale 65b, 65c or 65d corresponding to the diameter of the associated in-line piping after the flow meter 1 is installed. In such an application, markings or margins likely would be printed or formed on the flow tube to guide positioning of the scale label so that the proper calibration is obtained. It is also foreseen that the flowmeter could be formed without a shroud 51 including for embodiments with and without a sleeve 35.

Similarly, it is foreseen that a flow rate indicating scale 65a could be printed on, applied to or formed on the sleeve 35 in association with each slot 62b-d on a side opposite the temperature set point scales 65b-d. In such a configuration, the temperature set point and the actual flow rate could be viewed simultaneously without the need to rotate the sleeve 35. Similarly, if one of the scales 65b-d are printed directly on the flow tube 30, a flow rate indicating scale 65a could be printed adjacent or in spaced relation to the selected scale 65b-d to again allow simultaneous viewing of the temperature set points and the actual flow rate, as generally shown in FIG. 6 wherein the scales 65 are applied to the shroud 51 on opposite sides of the window 70.

What is claimed is:

1. A flow meter connectable in-line with a piping system for indicating flow characteristics of a known fluid flowing through the piping system of known internal diameter comprising:

a) a flow tube comprising a peripheral wall defining a hollow flow chamber therein and having a fluid inlet at a first end and a fluid outlet at a second end; at least a portion of said flow tube is transparent;

b) a piston slidably mounted within said flow chamber and having an indicator associated with said piston; wherein fluid flowing through said flow chamber from said fluid inlet to said fluid outlet acts on said piston to advance said piston toward said fluid outlet and wherein the distance said piston advances toward said outlet end increases with increases in the flow rate of the fluid flowing through said flow chamber;

c) a scale including a plurality of scale markings and associated temperature indicia aligned along a longitudinal axis of said flow tube proximate said transparent portion thereof, said scale markings and said associated temperature indicia calibrated to indicate the flow rate through the flow meter that must be obtained for the known fluid at a temperature corresponding to the selected scale marking to obtain a desired flow characteristic of the known fluid flowing through the piping system of known internal diameter at the specified temperature as indicated by alignment of said indicator associated with said piston with said selected scale marking.

2. The flow meter as in claim 1 wherein said desired flow characteristic comprises a selected Reynolds number.

3. The flow meter as in claim 1 wherein said desired flow characteristic comprises a selected Reynolds number indicative of turbulent flow through the piping system.

4. The flow meter as in claim 1 wherein said desired flow characteristic comprises a Reynolds number indicative of laminar flow through the piping system.

5. The flow meter as in claim 1 further comprising a flow rate indicating scale; said flow rate indicating scale comprising scale markings and scale indicia extending in axial alignment with said flow tube; said scale markings and scale indicia of said flow rate indicating scale calibrated to indicate the flow rate of the fluid flowing through said flow tube as indicated by alignment of said peripheral indicator on said piston with a scale marking and associated scale indicia.

6. A flow meter connectable in-line with a piping system for indicating flow characteristics of a known fluid flowing through the piping system of known internal diameter comprising:

a) a flow tube comprising a peripheral wall defining a hollow flow chamber therein and having a fluid inlet at a first end and a fluid outlet at a second end; at least a portion of said flow tube is transparent;

b) a piston slidably mounted within said flow chamber and having an indicator located on an outer periphery of said piston;

c) an inlet stop preventing said piston from sliding out of said flow chamber;

d) a compression spring positioned within said flow chamber and having a first spring end abutting against said piston and urging said piston toward said inlet stop and a second end of said compression spring abutting against an outlet stop positioned proximate said fluid outlet of said flow chamber; wherein fluid flowing through said flow chamber from said fluid inlet to said fluid outlet acts on said piston against the biasing force of said compression spring to advance said piston toward said fluid outlet and wherein the distance said piston advances toward said outlet end increases with increases in the flow rate of the fluid flowing through said flow chamber;

e) a first scale including a plurality of scale markings and associated temperature indicia aligned along a longitudinal axis of said flow tube proximate said transparent portion thereof, said scale markings and said associated temperature indicia calibrated to indicate the flow rate through the flow meter that must be obtained for the known fluid at a temperature corresponding to the selected scale marking to obtain a desired flow characteristic of the known fluid flowing through the piping system of known internal diameter at the specified temperature as indicated by alignment of said peripheral indicator on said piston with said selected scale marking.

7. The flow meter as in claim 6 wherein said desired flow characteristic comprises a selected Reynolds number.

8. The flow meter as in claim 6 wherein said desired flow characteristic comprises a selected Reynolds number indicative of turbulent flow through the piping system.

9. The flow meter as in claim 6 wherein said desired flow characteristic comprises a selected Reynolds number indicative of laminar flow through the piping system.

10. The flow meter as in claim 6 further comprising a flow rate indicating scale; said flow rate indicating scale comprising scale markings and scale indicia extending in axial alignment with said flow tube; said scale markings and scale indicia of said flow rate indicating scale calibrated to indicate the flow rate of the fluid flowing through said flow tube as indicated by alignment of said peripheral indicator on said piston with a scale marking and associated scale indicia.

11. The flow meter as in claim 6 wherein said piston is cylindrical and comprises a piston head, a piston tail and an axial bore extending therethrough; said indicator comprising an indicator band extending around said piston head; said first spring end extending within said piston tail and engaging a shoulder formed on the inner periphery of said piston.

12. A flow meter connectable in-line with a selected piping system having one of at least two known internal diameters, for indicating flow characteristics of a known fluid flowing through the selected piping system; said flow meter comprising:

a) a flow tube comprising a peripheral wall defining a hollow flow chamber therein and having a fluid inlet at a first end and a fluid outlet at a second end; at least a portion of said flow tube is transparent;

b) a piston slidably mounted within said flow chamber and having an indicator located on an outer periphery of said piston; wherein fluid flowing through said flow chamber from said fluid inlet to said fluid outlet acts on said piston to advance said piston toward said fluid outlet and wherein the distance said piston advances toward said outlet end increases with increases in the flow rate of the fluid flowing through said flow chamber;

e) a scale bearing sleeve rotatably mounted relative to said flow tube, said scale bearing sleeve having at least a first scale and a second scale, each of said first and second scales including a plurality of scale markings and associated temperature indicia formed on said scale bearing sleeve in alignment with a longitudinal axis of said flow tube proximate said transparent portion thereof; said scale markings and said associated temperature indicia of said first and second scales calibrated to indicate the flow rate through the flow meter that must be obtained for the known fluid at a temperature corresponding to the selected scale marking to obtain a desired flow characteristic of the known fluid flowing through the selected piping system having the first or second known internal diameter respectively at the specified temperature as indicated by alignment of said peripheral indicator on said piston with said selected scale marking.

13. The flow meter as in claim 12 wherein said desired flow characteristic comprises a selected Reynolds number.

14. The flow meter as in claim 12 wherein said desired flow characteristic comprises a selected Reynolds number indicative of turbulent flow through the associated piping system.

15. The flow meter as in claim 12 wherein said desired flow characteristic comprises a selected Reynolds number indicative of laminar flow through the associated piping system.

16. The flow meter as in claim 12 wherein a flow rate indicating scale is formed on said scale bearing sleeve; said flow rate indicating scale comprising scale markings and scale indicia extending in axial alignment with said flow tube; said scale markings and scale indicia of said flow rate indicating scale calibrated to indicate the flow rate of the fluid flowing through said flow tube as indicated by alignment of said peripheral indicator on said piston with a scale marking and associated scale indicia.

17. A flow meter connectable in-line with a selected piping system having one of at least three known internal diameters, for indicating flow characteristics of a known fluid flowing through the selected piping system; said flow meter comprising:
   a) a flow tube comprising a peripheral wall defining a hollow flow chamber therein and having a fluid inlet at a first end and a fluid outlet at a second end; at least a portion of said flow tube is transparent;
   b) a piston slidably mounted within said flow chamber and having an indicator band located on an outer periphery of said piston;
   c) an inlet stop preventing said piston from sliding out of said flow chamber;
   d) a compression spring positioned within said flow chamber and having a first spring end abutting against said piston and urging said piston toward said inlet stop and a second end of said compression spring abutting against an outlet stop positioned proximate said fluid outlet of said flow chamber; wherein fluid flowing through said flow chamber from said fluid inlet to said fluid outlet acts on said piston against the biasing force of said compression spring to advance said piston toward said fluid outlet and wherein the distance said piston advances toward said outlet end increases with increases in the flow rate of the fluid flowing through said flow chamber;
   e) a scale bearing sleeve rotatably mounted on said flow tube, said scale bearing sleeve having at least a first scale, a second scale, a third scale and a flow rate indicating scale, each of said first, second and third scales including a plurality of scale markings and associated temperature indicia formed on said scale bearing sleeve in alignment with a longitudinal axis of said flow tube proximate said transparent portion thereof; said scale markings and said associated temperature indicia of said first, second and third scales calibrated to indicate the flow rate through the flow meter that must be obtained for the known fluid at a temperature corresponding to the selected scale marking to obtain a desired flow characteristic of the known fluid flowing through the selected piping system having the first, second or third known internal diameter respectively at the specified temperature as indicated by alignment of said peripheral indicator band on said piston with said selected scale marking; said flow rate indicating scale comprising scale markings and scale indicia extending in axial alignment with said flow tube; said scale markings and scale indicia of said flow rate indicating scale calibrated to indicate the flow rate of the fluid flowing through said flow tube as indicated by alignment of said peripheral indicator on said piston with a scale marking and associated scale indicia; said sleeve rotatable relative to said flow tube to selectively advance one of said first, second, third and flow rate indicating scales into a selected rotational alignment relative to said flow tube to facilitate viewing.

18. The flow meter as in claim 17 wherein said desired flow characteristic comprises a selected Reynolds number.

19. The flow meter as in claim 17 wherein said desired flow characteristic comprises a selected Reynolds number indicative of turbulent flow through the selected piping system.

20. The flow meter as in claim 17 wherein said desired flow characteristic comprises a selected Reynolds number indicative of laminar flow through the selected piping system.

* * * * *